United States Patent [19]

Mosca

[11] 4,037,638
[45] July 26, 1977

[54] EMERGENCY KIT FOR VEHICLE TIRES

[76] Inventor: Rudolph Mosca, 225 Varick St., New York, N.Y. 10014

[21] Appl. No.: 643,633

[22] Filed: Dec. 23, 1975

[51] Int. Cl.² .............................................. B60C 23/10
[52] U.S. Cl. .................................................. 152/415
[58] Field of Search ............... 152/415, 416, 418, 419; 137/608; 141/38

[56] References Cited

U.S. PATENT DOCUMENTS

| 1,492,838 | 5/1924 | Dilweg ........................... | 152/415 |
| 2,227,601 | 1/1941 | O'Brien, Jr. .................... | 152/415 |
| 2,237,559 | 4/1941 | Jenne ............................. | 152/415 |
| 2,663,348 | 12/1953 | Farris ........................... | 152/415 |

FOREIGN PATENT DOCUMENTS

| 33,186 | 8/1928 | France ................................ | 152/415 |
| 315,736 | 7/1929 | United Kingdom ................. | 152/415 |

Primary Examiner—Drayton E. Hoffman
Attorney, Agent, or Firm—Joel Halpern

[57] ABSTRACT

An emergency kit for simultaneously equalizing the inflation pressure in the four tires of a motor vehicle and in the spare tire thereof. Four lengths of flexible tubing are interconnected by tee couplings. One end of three of such lengths of tubing is given a coupling for connection with the inflation valve of a tire whereas the other length of coupling has such a coupling at each end. A foot operable diaphragm pump is connected in one length of tubing.

3 Claims, 4 Drawing Figures

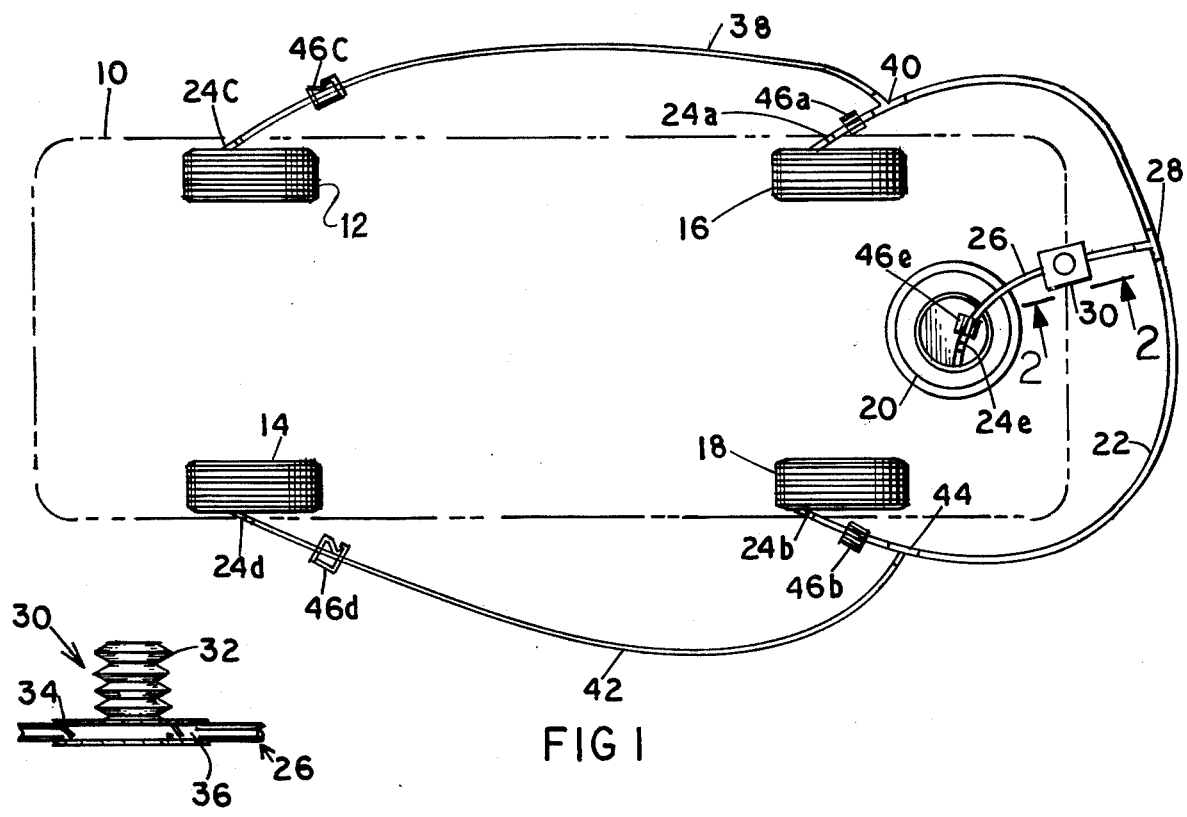
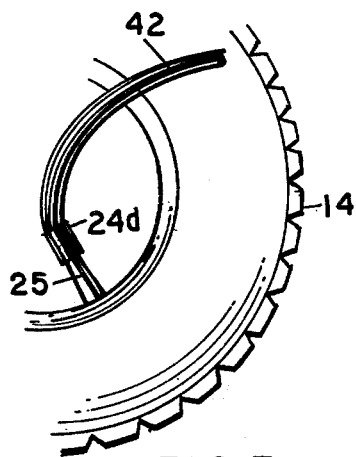
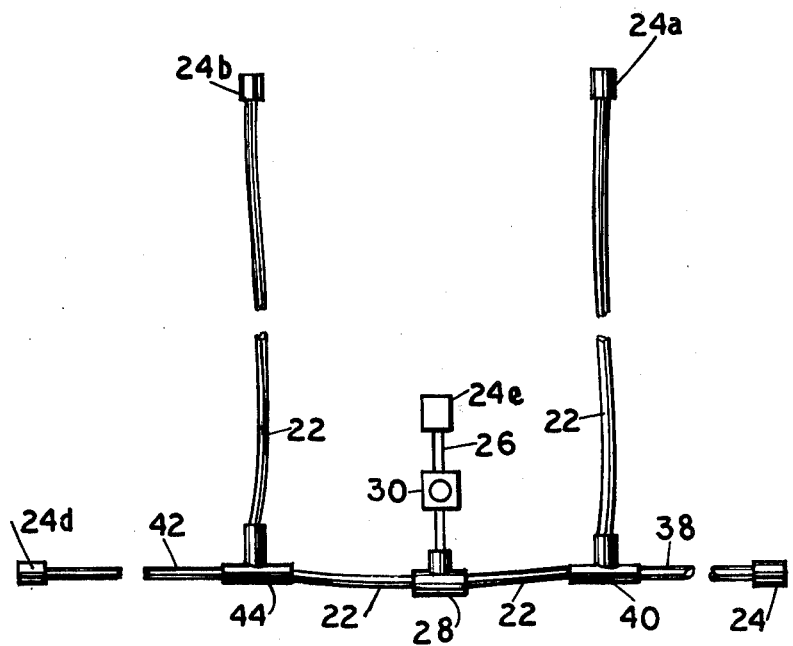

EMERGENCY KIT FOR VEHICLE TIRES su

BACKGROUND OF THE INVENTION

The present invention relates to kits for equalizing the pressure in and inflating the tires of a motor vehicle. More particularly the invention relates to a kit for simultaneously equalizing the pressure in all four tires and in the spare tire and for increasing the inflation tire in the four tires.

Devices for equalizing the pressure in the tires of a motor vehicle and for transferring inflation air from a spare tire to one or more deflated tires of a motor vehicle have been known heretofore. However there has not been available, prior to this invention, a kit which incorporates in a unitary assembly components which operate simultaneously on all four mounted tires and on the spare tire so as to benefit from any excess air contained in any of such tires and to permit, in an emergency, equal increasing of the air pressure in the mounted tires.

SUMMARY OF THE INVENTION

It is one object of the invention to provide an emergency kit for simultaneously equalizing the inflation pressure in all four mounted tires and in the spare tire of a motor vehicle.

It is another object of the invention to provide an emergency kit whereby the pressure in all four mounted tires is simultaneously equalized and the pressure in all of such tires can be increased equally.

Other objects and advantages of the invention will become readily apparent from the following description of the invention.

According to the present invention there is provided an emergency kit for simultaneously equalizing and increasing the inflation pressure in the four tires and in the spare tire of a motor vehicle comprising in combination:

a first length of flexible tubing having a coupling at each end thereof adapted to be sealingly connected with the inflation valve of a tire and to depress the valve stem thereof to open said inflation valve;

a second length of flexible tubing connected at one end thereof by means of a first tee coupling intermediate the ends of said first length of tubing and in open communication therewith, a couplig at the other end of said second length of tubing adapted to be sealingly connected with the inflation valve of a tire and to depress the valve stem thereof to open said inflation valve;

a manually operable pump having an air inlet and an air discharge side operatively connected in said second length of flexible tubing having the discharge side thereof on the side of said tee coupling;

third and fourth lengths of flexible tubing each having a coupling at one end adapted to be sealingly connected with the inflation valve of a tire and to depress the valve stem thereof to open said inflation valve and connected by means of second and third couplings to said first flexible tubing to be in open communication therewith, said second and third tee couplings being interposed in said first flexible tubing between said first tee coupling and the respective ends of said first flexible tubing;

and adjustable clamp means secured to each of said lengths of tubing for selectively permitting the flow of pressurized air therethrough.

BRIEF DESCRIPTION OF THE DRAWINGS

In order that the invention may be more fully understood it will now be described, by way of example, with reference to the accompanying drawings in which:

FIG. 1 is a plan view of a motor vehicle with the emergency kit of the invention applies to the tires thereof;

FIG. 2 is a cross-sectional view of the foot operable diaphragm pump and associated tubing shown in FIG. 1 taken along line 2—2 thereof;

FIG. 3 is a fragmentary side view of a mounted vehicle tire with a flexible hose of the emergency kit sealingly connected thereto; and FIG. 4 is a plan view, partially broken, showing the unitary assembly of the emergency kit of the invention.

DETAILED DESCRIPTION OF THE INVENTION

Referring to FIGS. 1 and 4 there is shown in broken lines the frame 10 of a motor vehicle, the four mounted tires 12, 14, 16, 18 and the spare tire 20 thereof.

A first length of flexible conduit 22 is provided at its opposed ends with a coupling 24 of conventional construction which is adapted to be sealingly connected with the inflation valve 25 of a tire. As is known, upon connecting the coupling with the inflation valve a pin element in the coupling engages the valve stem of the inflation valve and depresses the stem so as to permit the passage of air into and out of the tire. The couplings 24a, 24b, 24c, 24d and 24e at the ends of the four lengths of conduit described herein are all of this type. No one-way check valves are utilized so that the pressure within the interconnected system may equalize.

A second length of flexible conduit 26 has one end thereof connected intermediate the opposed ends of conduit 22 to be in open communication therewith. A tee coupling 28 has been found suitable for this connection. The other end of the conduit 26 is given a coupling 24e for sealingly connecting the conduit to the inflation valve of the spare tire.

A manually operable pump 30 which may desirably be a foot-controllable diaphragm pump is interposed in conduit 26 intermediate tee coupling 28 and coupling 24e. Such pump can be employed when considered necessary in order to simultaneously elevate the inflation pressure in all four mounted tires should it be found that the excess air in the spare tire and in the other tires is insufficient to provide sufficient inflation air for the deflated or flat tire to enable the driving of the vehicle to a gasoline station or garage for repair or replacement of the deflated tire and inflation of all of the remaining tires to their designed air pressure capacities. The pump, as shown in FIG. 2, includes a bellows element 32, and air inlet 34 and discharge 36 sides. It is connected in conduit 26 such that the discharge side of the pump opens at the side of the tee coupling 28 to thereby permit the simultaneous inflation of all four mounted tires.

A third flexible conduit 38 is provided at one end with coupling 24c for sealingly connecting the conduit with the inflation valve of a tire and at the other end with a tee coupling 40 for connection with conduit 22 at a point intermediate coupling 24a and tee coupling 28. In this manner the conduits 22 and 38 are in open communication.

A fourth flexible conduit 42 is given a coupling 24d at one end thereof to sealingly connect the conduit with the inflation valve of a tire and is furnished with tee coupling 44 at the other end to connect conduit 42 with conduit 22 in the same manner as described above with regard to the connection between conduits 22 and 38.

For a purpose to be hereinafter decribed each of the lengths of conduit or tubing is provided with a clamp such as a hose clamp 46a-e to selectively permit the passage of air therethrough.

All of the flexible conduits or tubing are preferably made of a light-weight material such as thin-walled polyethylene so as to facilitate the manipulation of the kit when it is used. By constructing the conduits of such light-weight and thin-walled material folding and storage of the unitary assembly is also simplified.

The couplings 24a-e are desirably of the snap-on type so as to expedite application of the kit to the tires of the vehicle.

In operation, when the operator of a motor vehicle experiences a badly deflated or flat tire he simply unfolds the kit assembly and attaches the couplings 24a-e to the mounted tires and to the spare tire of the vehicle, first making certain that the clamps 46a-e are tightened to prevent the escape of air from the tires through the respective lengths of tubing. When all of the lengths of tubing have been connected to the tires by couplings 24a-e the clamps are loosened to permit simultaneous equalization of the pressure of the thus interconnected tires. Should it be found necessary to increase the pressure in the tires in order to safely drive the veicle to a service station the pump 30 is operated to so increase the pressure. The clamps are once again tightened to prevent the escape of air from the tires, and each of the lengths of tubing are then disconnected from their associated inflation valve. The clamps may then be loosened to permit the escape of pressurized air from the tubing in order to make possible the folding of the tubing lengths preparatory to storage of the kit in the trunk of the vehicle.

From the foregoing it will be seen that an emergency kit assembly has been provided which can be easily stored within the trunk of a motor vehicle for use when required. The kit can simply be applied to the mounted tires of a vehicle and to the spare tire when the driver experiences a seriously deflated or flat tire. Upon such application the pressure in all of the tires is equalized, thereby utilizing the benefit of any excess air contained in one or more of the tires. The provision of a manually operable pump as a unitary component of the kit assembly also enables, when necessary, simultaneous elevation of the pressure in the tires while maintaining the equalized pressure relationship.

I claim:

1. An emergency kit for simultaneously equlizing and increasing the inflation pressure in the four tires and in the spare tire of a motor vehicle comprising in combination:

a first length of flexible tubing having a coupling at each end thereof adapted to be sealingly connected with the inflation valves of the rear tires of a vehicle and to depress the valve stems thereof to open said inflation valves;

a second length of flexible tubing connected at one end thereof by means of a first tee coupling intermediate the ends of said first length of tubing and in open communication therewith, a coupling at the other end of said second length of tubing adaptedto be sealingly connected with the inflation valve of a spare tire and to depress the valve stem thereof to open said inflation valve;

a manually operable pump having an air inlet and an air discharge side operatively connected in said second length of flexible tubing having the discharge side thereof on the side of said tee coupling;

third and fourth lengths of flexible tubing each having a coupling at one end adapted to be sealingly connected with the inflation valves of the respective front tires of a vehicle and to depress the valve stems thereof to open said inflation valves and connected by means of second and third tee couplings to said first flexible tubing to be in open communication therewith, said second and third tee couplings being interposed in said first flexible tubing between said first tee coupling and the respective ends of said first flexible tubing;

and adjustable clamp means secured to each of said lengths of tubing for selectively permitting the flow of pressurized air therethrough to and from the front and rear tires of the vehicle, said clamp means being so positioned in said lengths of tubing as not to interfere with the open communication between same even when all of said clamp means are closed.

2. A kit according to claim 1, wherein the couplings at the ends of said lengths of tubing are adapted to be snapped into sealing engagement with the inflation valves of the tires.

3. A kit according to claim 1, wherein said pump is a foot-controllable diaphragm pump.

* * * * *